(12) United States Patent
Etori (10) Patent No.: US 7,679,823 B2
(45) Date of Patent: Mar. 16, 2010

(54) REFLECTIVE SCREEN

(75) Inventor: Hideki Etori, Saitama (JP)

(73) Assignee: Kimoto Co., Ltd. (JP)

( * ) Notice: Subject to any disclaimer, the term of this patent is extended or adjusted under 35 U.S.C. 154(b) by 323 days.

(21) Appl. No.: 11/792,342

(22) PCT Filed: Dec. 7, 2005

(86) PCT No.: PCT/JP2005/022446

§ 371 (c)(1),
(2), (4) Date: Jun. 5, 2007

(87) PCT Pub. No.: WO2006/062123

PCT Pub. Date: Jun. 15, 2006

(65) Prior Publication Data

US 2008/0291536 A1    Nov. 27, 2008

(30) Foreign Application Priority Data

Dec. 8, 2004    (JP) .............................. 2004-354998

(51) Int. Cl.
G03B 21/56    (2006.01)
G02B 5/28    (2006.01)

(52) U.S. Cl. ...................................... 359/449; 359/589

(58) Field of Classification Search ................. 359/443, 359/449, 459, 585, 589
See application file for complete search history.

(56) References Cited

U.S. PATENT DOCUMENTS 6,847,483 B2 * 1/2005 Lippey et al. ............... 359/443
7,158,300 B2 * 1/2007 Shimoda ..................... 359/459
7,408,709 B2 * 8/2008 Shimoda et al. ............. 359/459
7,416,306 B2 * 8/2008 Yamamoto et al. ........... 353/31

FOREIGN PATENT DOCUMENTS

| JP | 2003-337381 | 11/2003 |
|---|---|---|
| JP | 2004-038003 | 2/2004 |
| JP | 2004-061521 | 2/2004 |
| JP | 2004-061546 | 2/2004 |
| JP | 2004-117480 | 4/2004 |
| JP | 2004-138938 | 5/2004 |
| JP | 2004-284232 | 10/2004 |

* cited by examiner

Primary Examiner—Christopher Mahoney
(74) Attorney, Agent, or Firm—Bacon & Thomas, PLLC (57) ABSTRACT

A reflective screen which can reflect high contrast images even in a bright environment and can reflect images with superior image color reproducibility, in particular, images substantially free from color change of the images, even when the screen is observed from an oblique direction. The reflective screen 6 uses a multilayer optical film consisting of at least two kinds of alternately laminated transparent dielectric thin films selectively reflecting lights of specific wavelength regions as a reflecting layer 2, and the reflecting layer 2 has a light reflecting property for light in the wavelength regions of blue, green, red, and 670 to 730 nm, and shows average reflectances for lights of the wavelength regions higher than the average reflectance for light in the visible wavelength region other than lights of the wavelength regions, respectively.

20 Claims, 4 Drawing Sheets

REFLECTIVE SCREEN

TECHNICAL FIELD

The present invention relates to a reflective screen for projectors for reflecting image lights projected from a projector to display images, in particular, a reflective screen which can reflect high contrast images in projection in a bright environment and can reflect images substantially free from color change of the images even when the screen is observed from an oblique direction.

BACKGROUND ART

There are known two-layer reflective screens provided with a reflecting layer for reflecting lights from a projector and a light diffusing layer for diffusing the reflected lights in order to reflect the lights projected from the projector to display images on the screens. For such two-layer reflective screens, used is a reflecting layer exhibiting a substantially constant reflectance for visible light irrespective of the wavelength thereof, such as an aluminum deposition layer or an aluminum paste coating layer, and the light reflected by this reflecting layer is further diffused by the light diffusing layer to enable observation of images with no glares in a comparatively wide viewing angle.

However, such reflective screens also reflect and diffuse light from the surroundings (environmental light) other than light of projected images, when the screens are exposed to such light. Therefore, if projection is performed in a bright environment, light originated in environmental light etc. is reflected and diffused also in intrinsically dark portions of images. As a result, brightness of the dark portions is increased to reduce the contrast of the images, and the images become hard to see. The conventional only way to prevent this phenomenon is darkening the room. However, reflective screens which can reflect high contrast images even in a bright environment have been increasingly desired with the spread of projectors.

Therefore, as reflective screens which can reflect high contrast images even in a bright environment, those formed by successively providing a reflecting layer for selectively reflecting lights of specific wavelengths and a light diffusing layer for diffusing reflected lights on a light absorbing substrate have been proposed (Patent documents 1 and 2). Such reflective screens selectively reflect only light in the wavelength regions of the three primary colors, i.e., blue (B), green (G), and red (R), constituting projector images with the reflecting layer, and absorb light of the other wavelength with the substrate 1, so as to suppress the increase of brightness of dark portions and thereby enable display of high contrast images even in a bright environment.

Used as the reflecting layer of such reflective screens is a multilayer optical film which selectively reflects light of specific wavelengths on the basis of interference of light, and it is designed so as to reflect light in the wavelength regions of blue, green and red entering from the front of the screens as light of projector images.

However, if light obliquely enter into screens using such a reflecting layer, the wavelength region of the reflected light shifts to the shorter wavelength side compared with the reflected light of light incident from the front direction. Due to such a property of the reflecting layer, even an incident light which would be reflected as a white light when it enters from the front direction becomes to be a bluish reflected light when it obliquely enters into the screen, because the wavelength thereof is shifted to the shorter wavelength side.

Such a phenomenon does not pose any problem for light of projector images which usually enters into the screen from the front direction. However, the incidence direction of environmental light is not constant with respect to the screen, and reflected light of environmental light incident with large angles becomes bluish.

Therefore, if an observer is in the front of the screen, the reflected light of the environmental light reaching the observer does not suffer from the shift, and the reflected light of the projector image can be correctly recognized. However, if the observer sees the screen from an oblique direction, there arises a problem that the reflected light of the light from the projector and the bluish reflected light of the environmental light with large incidence angles both reach the eyes, which results in that the whole images are bluely recognized, and thus incorrect image colors are recognized.

Although Patent document 2 refers to reduction of the reflectance for light in the image color wavelength region due to change of the incidence angle of the light of projector images, it does not consider at all the change of observable image colors caused depending on the position of the observer with respect to the screen, and thus reproducibility of image colors is insufficient when the screen is observed from an oblique direction.

Patent document 1: Japanese Patent Unexamined Publication (Kokai) No. 2003-337381 (claim 1)

Patent document 2: Japanese Patent Unexamined Publication No. 2004-138938 (claim 1)

DISCLOSURE OF THE INVENTION

Object to be Achieved by the Invention

Therefore, an object of the present invention is to provide a reflective screen which can reflect high contrast images even in a bright environment and can reflect images with superior image color reproducibility, in particular, images substantially free from color change of the images even when the screen is observed from an oblique direction.

Means for Achieving the Object

The reflective screen of the present invention uses a multilayer optical film consisting of at least two kinds of alternately laminated transparent dielectric thin films showing different refractive indices, and selectively reflecting light in specific wavelength regions as a reflecting layer, and this reflecting layer is characterized by having a light reflecting property for lights in the wavelength regions of blue, green, red, and 670 to 730 nm, and showing average reflectances for respective light of the aforementioned wavelength regions higher than the average reflectance for light in the visible wavelength region other than light in the aforementioned wavelength regions.

The reflecting layer preferably shows a difference of 10% or more between each of the average reflectances for light in the wavelength regions of blue, green, red and 670 to 730 nm and the average reflectance for light in the visible wavelength region other than light of the aforementioned wavelength regions.

The reflecting layer preferably shows a difference of 25% or more between each of the maximum reflectances for light in the wavelength regions of blue, green, red and 670 to 730 nm and the average reflectance for light in the visible wavelength region other than lights of the aforementioned wavelength regions.

The reflecting layer preferably shows an average reflectance for light in the wavelength region of 670 to 730 nm substantially equal to the average reflectance for light of the red wavelength region.

The reflecting layer preferably comprises a transparent polymer resin.

The reflecting layer is preferably formed by a multilayer extrusion method.

The reflecting layer is preferably formed by laminating a first reflecting layer having a light reflecting property for light in the blue wavelength region, a second reflecting layer having a light reflecting property for light in the green wavelength region, a third reflecting layer having a light reflecting property for light in the red wavelength region, and a fourth reflecting layer having a light reflecting property for light in the wavelength region of 670 to 730 nm.

The reflective screen preferably has a light absorbing layer for absorbing light transmitting the reflecting layer on a surface of the reflecting layer opposite to the light incident surface.

The light absorbing layer preferably consists of a black film.

The reflective screen preferably has a light diffuser on the light incident surface side with respect to the reflecting layer.

The light diffuser preferably shows a haze of 60% or more according to JIS K7105:1981, a total light transmission of 70% or more according to JIS K7361-1:1997, and a tristimulus value Y of 10 or less according to the reflection method of JIS Z8722:2000.

The light diffuser more preferably has at least a light diffusing layer, the light diffusing layer preferably comprises transparent spherical microparticles and a transparent binder having a refractive index different from that of the spherical microparticles, the spherical microparticles preferably have a mean particle diameter of 1 to 10 μm, and the value obtained by dividing the refractive index of the spherical microparticles with the refractive index of the transparent binder is preferably 0.91 or more and 1.09 or less (except for a value of 1.00).

Effect of the Invention

According to the present invention, a reflective screen which can reflect high contrast images even in a bright environment and images with superior image color reproducibility, in particular, images substantially free from color change of the images even when the screen is observed from an oblique direction, can be obtained.

BEST MODE FOR CARRYING OUT THE INVENTION

Hereafter, embodiments of the reflective screen of the present invention will be explained.

The reflective screen of the present invention uses a multilayer optical film consisting of at least two kinds of alternately laminated transparent dielectric thin films showing different refractive indices, and selectively reflecting lights of specific wavelength regions as a reflecting layer, and this reflecting layer has a light reflecting property for light in the wavelength regions of blue, green, red, and 670 to 730 nm, and shows average reflectances for respective light in the aforementioned wavelength regions higher than the average reflectance for light in the visible wavelength region other than those of the aforementioned wavelength regions.

Blue (B), green (G) and red (R) are the three primary colors of light constituting projector images, and the wavelength regions thereof are about 420 to 480 nm (blue (B), center wavelength: 450 nm), about 520 to 580 nm (green (G), center wavelength: 550 nm), and about 590 to 650 nm (red (R), center wavelength: 620 nm). Henceforth the wavelength region of 670 to 730 nm, of which center wavelength is 700 nm, is referred to as red' (R').

Figure 1:
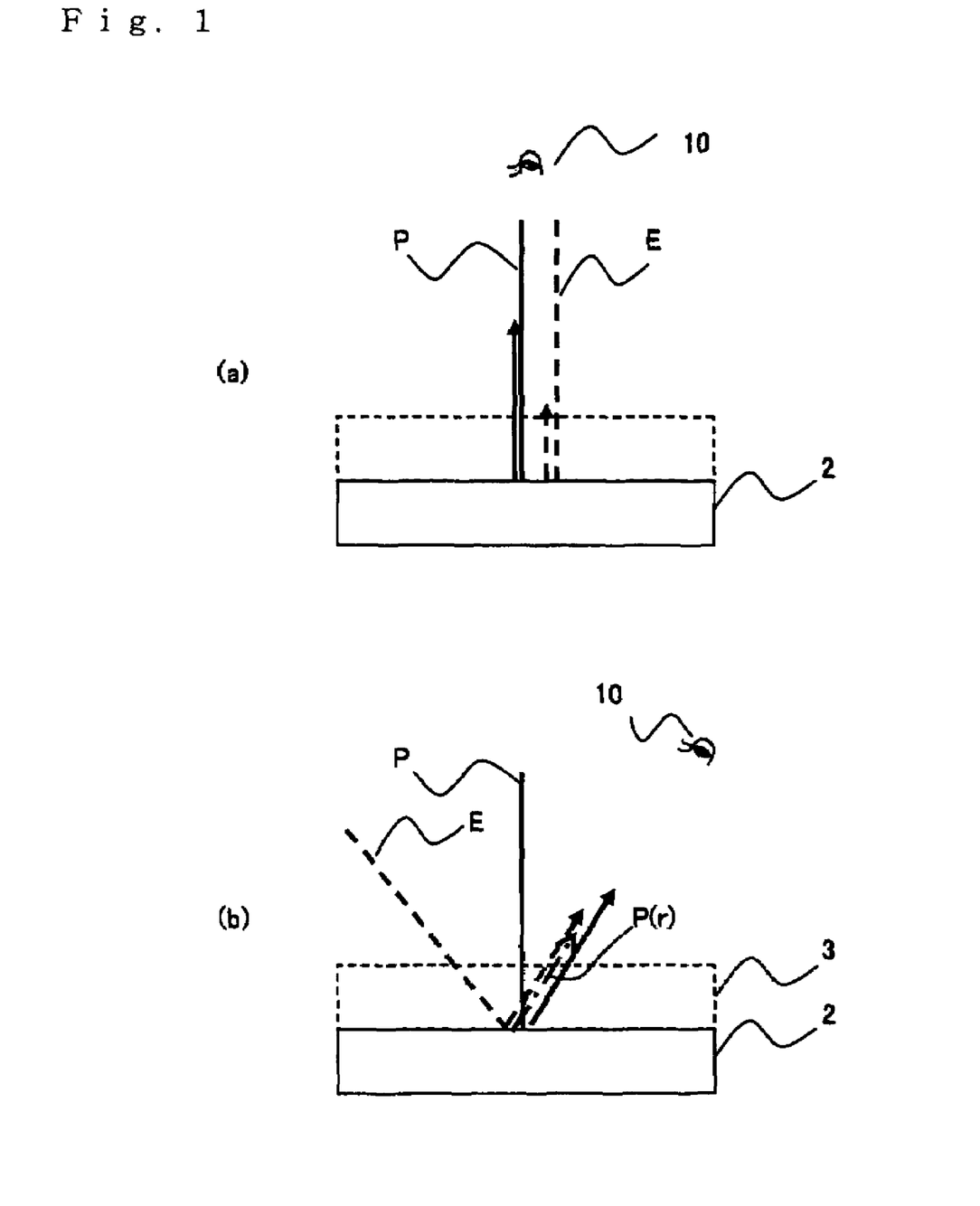
FIG. 1 Drawings for explaining the theory of the reflective screen of the present invention.

Hereafter, the theory of the reflective screen of the present invention will be explained with reference to FIG. 1. When the reflective screen of the present invention is observed from the front of the screen as shown in FIG. 1 (a), most of light in the three primary color wavelength regions constituting projector images (represented by a solid line in the drawings) is reflected. In contrast, an amount of a light component which is not reflected by the reflecting layer and transmits the reflecting layer is larger in environmental light (represented by a broken line) than in the light from the projector, because wavelengths of the environmental light distribute over a wide wavelength region. Therefore, reflection of environmental light can be relatively decreased without reducing image light from the projector. As a result, decrease of the contrast of the images projected on the reflective screen is suppressed, and thus clear high contrast images can be obtained even in a bright projection environment.

On the other hand, when the screen is observed from an oblique direction as shown in FIG. 1 (b), by providing a light diffuser on the reflecting layer, reflected light in the three primary color wavelength regions constituting projector images (solid line) is diffused to the direction of the observer by the light diffuser and can be observed by the observer. However, a large amount of reflected light of environmental light of large incidence angles (broken line) are mixed in the reflected light of the light from the projector diffused along the direction of the observer. Since the wavelength region of light incident with a large incidence angle and reflected by the multilayer optical film (reflecting layer) shifts to the shorter wavelength side, the reflected light of environmental light becomes a bluish reflected light.

However, the screen of the present invention shows a high reflectance also for light in the wavelength region of R', not only for light in the three primary color wavelength regions of B, G and R, therefore light of the wavelength region of R' is similarly reflected with shift of the wavelength region to the shorter wavelength side, and the reflected light of the red component (alternate long and short dash line) is thereby compensated. As a result, even when the screen is observed from an oblique direction, observation of bluish image color under the influence of the reflected light of environmental light is prevented, and thus reproducibility of the image color can be enhanced.

On the other hand, when the screen is observed from the front, since visual sensitivity for light in the wavelength region of R' is extremely low, even if lights of this region is reflected, the observer cannot perceive it, and thus the observed color and contrast of image light are hardly influenced.

Hereafter, embodiments of the constituents of the screen of the present invention will be explained.

The reflecting layer is explained first. The reflecting layer has a light reflecting property for light in the three primary colors of light, i.e., light in the three primary color wavelength regions of B, G and R, constituting images projected from a projector, and the light of the wavelength region of R', and shows average reflectances for respective light of the wavelength regions of B, G, R, and R' higher than the average reflectance for light in the visible wavelength region other than that of the aforementioned wavelength regions.

The average reflectance referred to herein means an average of reflectances for every wavelength in a specific wavelength range, and it can practically be obtained by using reflectances measured for light in the visible wavelength region (wavelength of from 380 to 780 nm) at equal intervals of 10 nm or less. In this specification, an average reflectance obtained from reflectances measured at intervals of 5 nm is used as the average reflectance. The average reflectances for lights in the wavelength regions of B, G, R, and R' can be obtained by averaging the reflectances for light of each region. Further, the average reflectance for light other than those of the wavelength regions of B, G, R, and R' can be obtained by averaging reflectances for light in the visible wavelength region other than that in the wavelength regions of B, G, R, and R'.

Such a reflecting layer is a band-pass filter reflecting light in the wavelength regions of B, G, R, and R', and consists of a multilayer optical film formed by alternately laminating many layers of at least two kinds of transparent dielectrics showing different refractive indices.

Although the multilayer optical film can be prepared by alternately laminating thin membranes of inorganic substances such as titanium oxide ($TiO_2$) and magnesium fluoride ($MgF_2$), a multilayer optical film formed by alternately laminating transparent polymer resins showing different refractive indices is preferred in view of productivity. Examples of the transparent polymer material include, for example, polycarbonate (PC), polyethylene terephthalate (PET), polyethylene naphthalate (PEN), and so forth. As the combination of them showing different refractive indices, materials showing different refractive indices may be chosen from those materials as the combination, or films of one kind of material may be stretched in different degrees to have different refractive indices as the combination. Further, the reflecting layer is preferably formed by multilayer extrusion of polymer resins.

The multilayer optical film can be obtained so as to have desired reflection characteristics (reflection wavelength, reflectance, waveband) by appropriately choosing film thickness and difference in refractive index of dielectrics to be laminated, and number of films to be laminated. As for the reflection wavelength, film thickness of the dielectric to be laminated should be $1/4$, $5/4$, $9/4$, or the like of the wavelength to be reflected as the optical film thickness (=refractive index× film thickness). As for the reflectance, with a larger difference between the refractive indices of two kinds of dielectrics to be laminated, a higher reflectance can be obtained with the same number of laminated films. Further, even when the difference of refractive indices is small, the same reflectance can be attained by increasing the number of laminated films.

A wider waveband can be obtained with a larger difference in the refractive indices of two kinds of dielectrics to be laminated. However, even if a combination of materials showing a small difference of refractive indices and a narrow waveband is used, the waveband can be broadened by laminating many dielectric films having a film thickness slightly deviated from the center value (optical film thickness satisfying the predetermined relation with respect to wavelength of light in any of the aforementioned wavelength regions). Therefore, such a method is effective for obtaining a broader band by using a combination of dielectrics showing a small difference of refractive indices such as a combination of polymer resins. By broadening the bands of the wavelength regions of B, G, R, and R', a reflective screen showing favorable selective reflection property irrespective of the type of projector can be provided.

Although the average reflectances for respective light in the wavelength regions of B, G, R, and R' are not particularly limited in the reflective screen of the present invention, they are preferably 25% or more, more preferably 30% or more. Further, the differences between each of the average reflectances for light in the wavelength regions of B, G, R, and R' and the average reflectance for light in the visible wavelength region other than those of the aforementioned wavelength regions are preferably 10% or more, more preferably 15% or more, still more preferably 20% or more.

Although the maximum reflectances for light in the wavelength regions of B, G, R, and R' are not also particularly limited in the reflective screen of the present invention, they are preferably 40% or more, more preferably 50% or more. Further, the differences between each of the maximum reflectances for light in the wavelength regions of B, G, R, and R' and the average reflectance for light in the visible wavelength region other than those of the aforementioned wavelength regions are preferably 25% or more, more preferably 30% or more.

By choosing the average reflectances and maximum reflectances for light in the wavelength regions of B, G, R, and R', and differences of these and the average reflectance for light in the visible wavelength region other than light in these wavelength regions to be within the aforementioned ranges, respectively, reflection of environmental light can be relatively decreased. Therefore, the decrease of contrast of images projected on the reflective screen is suppressed, and thus clear high contrast images can be obtained even in a bright projection environment.

In the reflective screen of the present invention, reflected light in the wavelength region of R' is that for compensating red component of reflected light for light with a large incidence angle. Therefore, the average reflectance for light in the wavelength region of R' is preferably substantially equal to the average reflectance for light in the wavelength region of R. By choosing substantially equal average reflectances for light in the wavelength regions of R' and R as described above, degradation of color valance due to bluing of image color under the influence of reflected lights of environmental light can be prevented, even when the screen is observed from an oblique direction. The term "substantially equal" used herein means that the average reflectance for R' is about 70 to 130% of the average reflectance for R.

Figure 2:
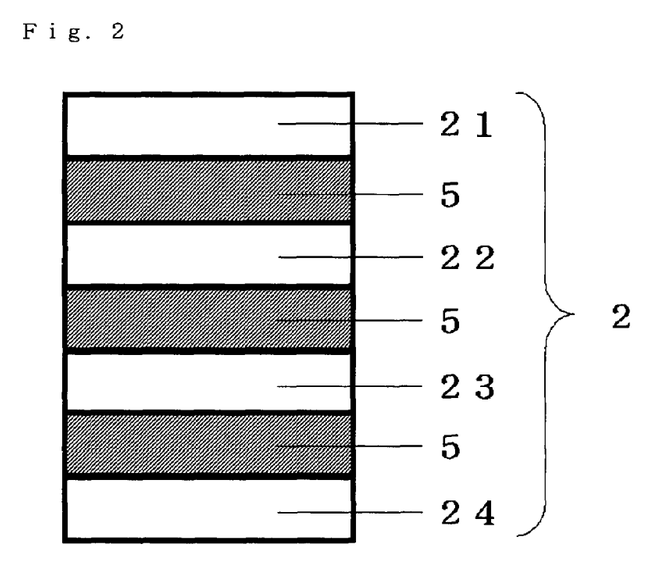
FIG. 2 A sectional view showing an embodiment of the reflecting layer of the reflective screen of the present invention.

It is sufficient that the reflecting layer used for the present invention as a whole should have high reflectance regions for light of the four wavelength regions of B, G, R, and R', and for example, as shown in FIG. 2, it may consist of optically contacted four kinds of reflecting layers 21, 22, 23, and 24 each of which has a high reflectance region only for one of B, G, R, and R'. In such a case, specifically, they can be laminated with a tackifier 5, by heat compression bonding, or the like. Alternatively, a reflecting layer having high reflectance regions for light of at least two of the wavelength regions of B, G, R, and R', and a reflecting layer having high reflectance regions for light of the other regions may be laminated (not shown), or as shown in FIG. 3 (*a*), one kind of reflecting layer 2 showing high reflectance regions for light of the four wavelength regions of B, G, R, and R' may also be used.

Figure 3:
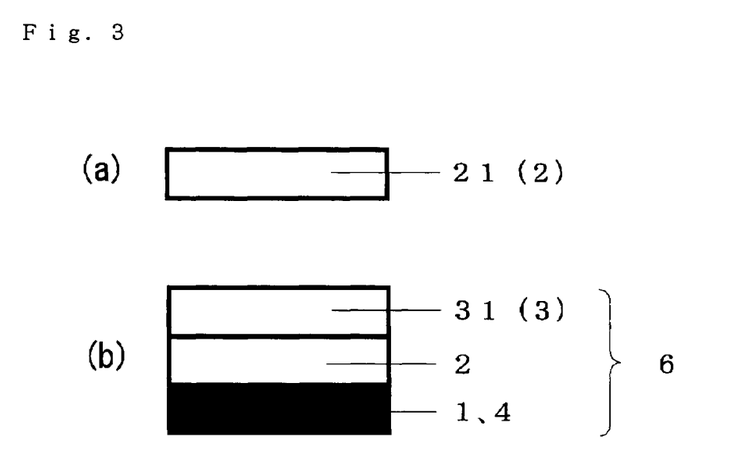
FIG. 3 Sectional views showing an embodiment of the reflective screen of the present invention (b), and another example of the reflecting layer (a).

Such a reflecting layer is usually provided on a substrate 1 as shown in FIG. 3 (*b*). The substrate serves as a support of the reflective screen of the present invention, and a board or a sheet can be chosen for it depending on the purpose of use. As the substrate, transparent or opaque substrates comprising glass, metal, polymer resin or the like can be used. Examples of the resin include, for example, polycarbonate (PC), polyethylene terephthalate (PET), polyethylene naphthalate (PEN), polyethersulfone (PES), polyolefin (PO), and so forth.

Further, the reflective screen of the present invention preferably has a light absorbing layer for absorbing light transmitting the reflecting layer on a surface of the reflecting layer opposite to the light entering surface. If such a light absorbing layer is provided as described above, the light absorbing layer absorbs light transmitting the reflecting layer, and therefore keeps the lights transmitting the reflecting layer from reflecting. This makes only light in the wavelength regions of B, G, R, and R' to be reflected as described above, and prevents brightening of dark portions of projector images due to reflection of environmental light and decrease of contrast.

Such a light absorbing layer can be formed by coating a black paint or the like on one surface or both surfaces of the substrate. When the light absorbing layer is prepared on one surface of the substrate, the reflecting layer may be provided on the light absorbing layer, or when the substrate is transparent, the reflecting layer may be provided on the surface of the substrate opposite to the surface having the light absorbing layer. Further, as shown in FIG. 3 (b), a substrate which itself is made black by, for example, incorporating a light absorbing agent such as a black pigment may also be used as the light absorbing layer 4. The light absorbing layer is preferably formed by coating a black paint on the substrate, or by using a black film as the substrate which itself is made black, as described above.

Further, the reflective screen of the present invention preferably has a light diffuser 3 (light diffusing layer 31) on the light incident surface side with respect to the reflecting layer of the reflective screen. The light diffuser is provided in order to diffuse the light reflected by the aforementioned reflecting layer to eliminate glares of images and enabling observation of images with a wide viewing angle. In the present invention, the light diffuser desirably shows a haze according to JIS K7105:1981 (henceforth also simply referred to as "haze") of 60% or more, preferably 70% or more, a total light transmission according to JIS K7361-1:1997 (henceforth also simply referred to as "total light transmission") of 70% or more, preferably 80% or more, and a tristimulus value Y according to the reflection method of JIS Z8722:2000 (henceforth also simply referred to as "tristimulus value Y") of 10 or less, preferably 8 or less. The tristimulus value Y according to the reflection method of JIS Z8722:2000 corresponds to luminous quantity, and a smaller value indicates less back diffused light.

By using a light diffuser having such optical characteristics, back diffused light (light diffused to the direction contrary to the advancing direction of the incident light), which is generated when environmental light other than the image light from a projector enter into the light diffuser, can be reduced, therefore brightening of dark portions of projector images can be prevented even in projection in a bright environment, and images can be reflected with still higher contrast.

Such a light diffuser should have at least a light diffusing layer, and examples of the light diffusing layer include those comprising transparent spherical microparticles and a transparent binder having a refractive index different from that of the spherical microparticles.

The transparent binder may be a binder which is transparent and can retain the spherical microparticles in a uniformly dispersed state, and examples include fluids such as liquids and liquid crystals, solids such as glass and polymer resins. In view of handling property and dispersion stability, polymer resins are preferred.

Glass used as the transparent binder is not particularly limited so long as the light transmission property of the light diffusing layer is not lost. Examples of glass generally used include oxide glass such as silicate glass, phosphate glass and borate glass, and so forth.

As the polymer resin used as the transparent binder, thermoplastic resins, thermosetting resins, ionizing radiation curable resins such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, and fluorocarbon resins, and so forth can be used.

As the spherical microparticles, inorganic microparticles such as those of silica, alumina, talc, zirconia, zinc oxide, and titanium dioxide, and organic microparticles such as those of polymethyl methacrylate, polystyrene, polyurethane, benzoguanamine, and silicone resin can be used. Organic microparticles are particularly preferred in view of ease of obtaining spherical shape.

Particle diameter of the spherical microparticles is preferably 1 to 10 µm, more preferably 2 to 6 µm, in terms of mean particle diameter. By using microparticles having a mean particle diameter within such a range, a light diffusing layer showing a haze of 60% or more, and a tristimulus value Y of 10 or less can be obtained, and light diffusing backward with respect to the advancing direction of light (back diffused light) can be reduced, while maintaining high diffusing property. Since the back diffused light can be reduced thereby when environmental light other than the image lights from a projector enters into the light diffusing layer, brightening of dark portions of projector images can be prevented even in projection in a bright environment, and images can be reflected with still higher contrast.

Particle diameter distribution of the spherical microparticles is not particularly limited so long as the mean particle diameter is within the aforementioned range, and it may be monodisperse distribution or polydisperse distribution. In view of further reduction of back diffused light, monodisperse distribution is preferred.

Further, as for the refractive indices of the spherical microparticles and the transparent binder, the value obtained by dividing the refractive index of the spherical microparticles with the refractive index of the transparent binder is preferably 0.91 or more and 1.09 or less (except for a value of 1.00). By using the spherical microparticles and the transparent binder providing such a value as the value obtained by dividing the refractive index of the spherical microparticles with the refractive index of the transparent binder, a light diffusing layer showing a haze of 60% or more, and a tristimulus value Y of 10 or less can be obtained, and lights diffusing backward with respect to the light advancing direction (back diffused light) can be reduced while maintaining high diffusing property. Since the back diffused light can be reduced thereby when environmental light other than the image light from a projector enters into the light diffusing layer, brightening of dark portions of projector images can be prevented even in projection in a bright environment, and images can be reflected with still higher contrast.

Content of the spherical microparticles in the light diffusing layer and thickness of the light diffusing layer vary depending on the refractive index of the spherical microparticles and the refractive index of the transparent binder, and therefore they cannot be generally defined. However, the mean particle diameter of the spherical microparticles may be selected to be within the aforementioned range (1 to 10 μm), then a combination of materials may be selected so that the value obtained by dividing the refractive index of the spherical microparticles with the refractive index of the transparent binder should be within the aforementioned range (0.91 or more and 1.09 or less, except for a value of 1.00), and finally the content and the film thickness of the light diffusing layer may be adjusted so that the haze should become 60% or more. By adjusting the haze to be 60% or more, it becomes possible to diffuse reflected lights of images projected from a projector to an appropriate degree, and thereby sufficiently broaden the viewing angle. Further, by adjusting the total light transmission to be 70% or more, incident light from a projector can be made to efficiently transmit to the reflecting layer, and therefore images can be reflected more brightly.

The light diffuser described above preferably has a substantially smooth surface. In the present invention, the term "substantially smooth" means to have an arithmetic average roughness (Ra) of 0.30 μm or less, preferably 0.15 μm or less, according to JIS B0601:2001. By adjusting the arithmetic average roughness to be within such a range, reflection of outer lights can be reduced while the tristimulus value Y is maintained to be 10 or less, and therefore a screen easier to see can be obtained.

Figure 4:
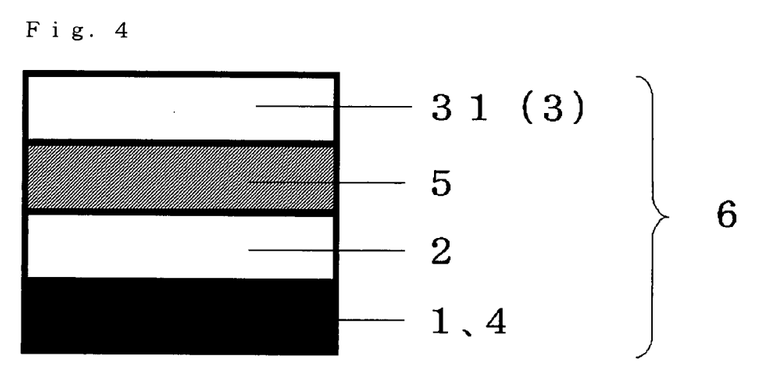
FIG. 4 A sectional view showing another embodiment of the reflective screen of the present invention.
Figure 5:
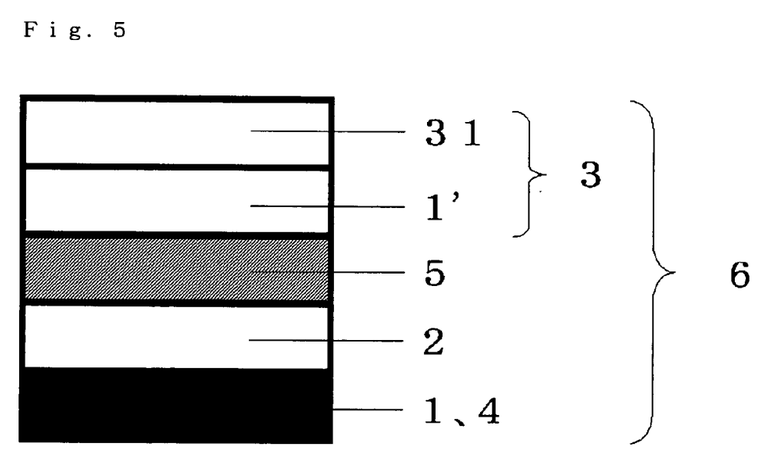
FIG. 5 A sectional view showing another embodiment of the reflective screen of the present invention.
Figure 6:
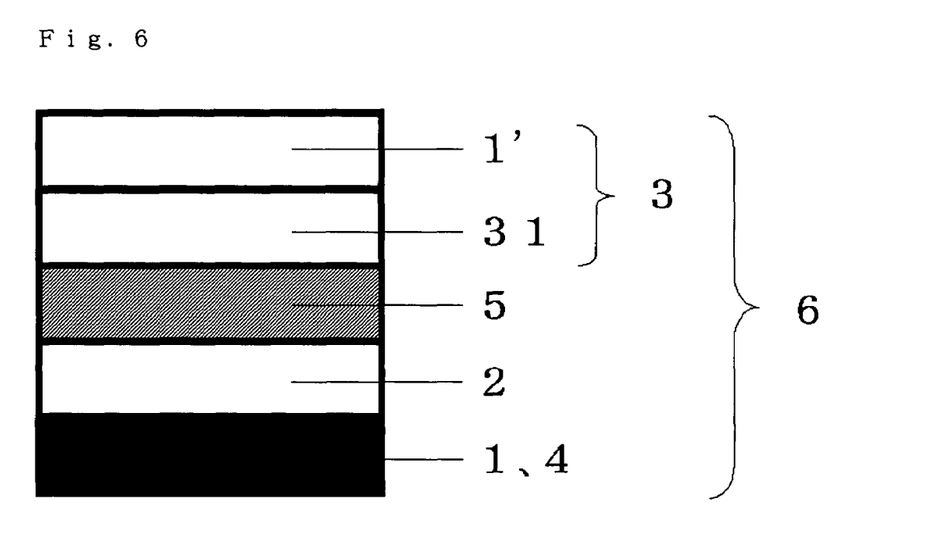
FIG. 6 A sectional view showing another embodiment of the reflective screen of the present invention.
Figure 7:
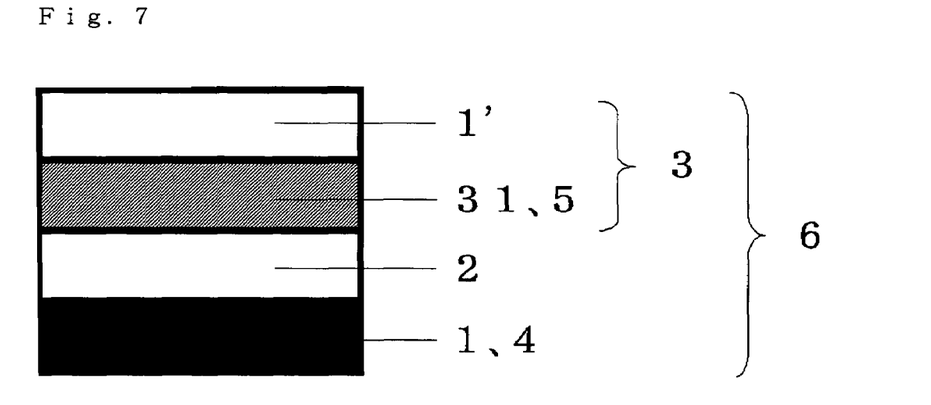
FIG. 7 A sectional view showing another embodiment of the reflective screen of the present invention.

Such a light diffuser 3 as described above can be formed as a light diffusing layer 31 by, for example, applying a paint prepared from the spherical microparticles and a polymer resin on the reflecting layer 2, and drying the paint (FIG. 3 (b)). Or, a polymer resin can be melted, mixed with the spherical microparticles, and formed into a sheet, and then the sheet can be adhered on the reflecting layer 2 via an adhesive layer 5 or the like (FIG. 4). Alternatively, a paint prepared from the spherical microparticles and a polymer resin can be applied on a transparent substrate 1' made of glass, polymer resin or the like, which is similar to the substrate 1 mentioned above, and dried, and then the transparent substrate can be adhered to the reflecting layer 2 via an adhesive layer 5 or the like (FIGS. 5 and 6). Moreover, a tackifier can be used as the transparent binder used in the light diffusing layer 31 to prepare a coating solution, and this coating solution for the light diffusing layer 31 can be applied on the substrate 1', and dried to form the light diffusing layer, and the coated substrate can be adhered on the reflecting layer 2 (FIG. 7).

Besides the elements described above, another layer or other layers may be added to the reflective screen of the present invention in order to improve the screen characteristics. For example, an anti-reflection layer may be provided as the uppermost layer. This makes it possible to prevent decrease of the amount of lights of images projected from a projector to produce brighter images on the screen and reduce reflection of external light to make the screen easier to see.

Further, so long as the tristimulus value Y is maintained to be 10 or less, fine convexes and concaves may be provided on the surface for preventing reflection of outer lights. This makes it possible to minimize reduction of contrast and reduce difficulty of seeing images due to reflection of external light.

A hard coat layer may also be provided as the uppermost layer of the reflective screen of the present invention. This makes it possible to prevent degradation of display quality due to scratching of the surface of the screen.

As explained above, the reflective screen of the present invention uses a multilayer optical film formed by laminating thin films consisting of at least two kinds of dielectrics having different refractive indices, and reflecting lights of specific wavelength regions as a reflecting layer. The reflecting layer has a light reflecting property for light in wavelength regions of B, G, R, and R', and shows average reflectances for light in the wavelength regions of B, G, R, and R' higher than the average reflectance for light in the visible wavelength region other than those of the aforementioned wavelength regions, respectively. Therefore, the reflective screen of the present invention can reflect high contrast images even in a bright environment, in particular, high contrast images without increasing brightness of dark portions of the projector images, and can reflect images with high image color reproducibility, in particular, images substantially free from color change, even when the screen is observed from an oblique direction.

EXAMPLES

Hereafter, the present invention will be explained in more detail with reference to examples. In the examples, the term and symbol, "part" and "%", are used on a weight basis unless specifically indicated.

Example 1

Between two polyethylene terephthalate layers (refractive index: 1.64), 63 layers of polyethylene naphthalate layers (refractive index 1.73, 0.104 μm) and polyethylene terephthalate layers (the same as that mentioned above, 0.104 μm) were alternately laminated to form an R' reflecting layer having a total film thickness of 20 μm (65 layers).

Similarly, between two polyethylene terephthalate layers, 63 layers of polyethylene naphthalate layers (0.092 μm) and polyethylene terephthalate layers (0.092 μm) were alternately laminated to form an R reflecting layer having a total film thickness of 20 μm (65 layers).

Moreover, between two polyethylene terephthalate layers, 63 layers of polyethylene naphthalate layers (0.081 μm) and polyethylene terephthalate layers (0.081 μm) were alternately laminated to form a G reflecting layer having a total film thickness of 20 μm (65 layers).

Furthermore, between two polyethylene terephthalate layers, 63 layers of polyethylene naphthalate layers (0.067 μm) and polyethylene terephthalate layers (0.067 μm) were alternately laminated to form a B reflecting layer having a total film thickness of 20 μm (65 layers).

On a black film having a thickness of 100 μm (Lumirror X30, Toray Industries, Inc.), the aforementioned R' reflecting layer, R reflecting layer, G reflecting layer, and B reflecting layer were laminated in this order with an adhesive layer having a thickness of 10 μm formed for each reflecting layer by applying a coating solution for adhesive layer having the following composition and drying the coated solution.

Then, by applying a coating solution for light diffusing layer having the following composition on the reflecting layer, and drying the coated solution, a light diffusing layer having a thickness of 35 μm was formed to obtain a reflective screen of Example 1. The average reflectances of the reflective screen of Example 1 for light in the wavelength regions of B, G, R, and R' were 34.2%, 38.5%, 38.2%, and 38.0%, respectively, and the maximum reflectances of the same for light in the wavelength regions of B, G, R, and R' were 44.9%, 49.1%, 52.7%, and 45.3%, respectively. Further, the average reflectance for light in the visible wavelength region other than light in the wavelength regions of B, G, R, and R' was 15.7%. The average reflectances were obtained from reflectances measured at intervals of 5 nm.

When the light diffusing layer was formed on a transparent film in the same manner, and the surface of the light diffusing layer was used as the measurement surface, the film having the light diffusing layer showed a haze of 90.3%, a total light transmission of 96.3%, and a tristimulus value Y of 5.8 according to the reflection method. The value obtained by dividing the refractive index of the spherical microparticles with the refractive index of the transparent binder was 0.92.

<Composition of Coating Solution for Adhesive Layer of Example 1>

| | |
|---|---|
| Acrylic type adhesive (solid content: 40%, Oribain BPS1109, TOYO INK MFG. CO., LTD.) | 100 parts |
| Isocyanate type curing agent (solid content: 38%, Oribain BHS8515, TOYO INK MFG. CO., LTD.) | 2.4 parts |
| Ethyl acetate | 100 parts |

<Composition of Coating Solution for Light Diffusing Layer of Example 1>

| | |
|---|---|
| Transparent binder (polyester resin, refractive index: 1.56, solid content: 100%, Kemit 1249, Toray Industries, Inc.) | 100 parts |
| Spherical microparticles (silicone resin, refractive index: 1.44, mean particle diameter: 2.0 μm, Tospearl 120, GE Toshiba Silicones Co., Ltd.) | 6 parts |
| Methyl ethyl ketone | 75 parts |
| Toluene | 75 parts |

Example 2

An adhesive light diffuser having a thickness of 35 μm was formed by applying a coating solution for light diffusing layer having the following composition on a transparent film having a thickness of 75 μm (Lumirror T60, Toray Industries, Inc.), and drying the coated solution.

Then, B, G, R, and R' reflecting layers were formed on a black film in the same manner as that in Example 1, and the surface of the light diffusing layer of the aforementioned light diffuser was adhered on the reflecting layers to obtain a reflective screen of Example 2. The average reflectances and maximum reflectances for lights of the wavelength regions of B, G, R, and R', and the average reflectance for light in the visible wavelength region other than lights of the aforementioned wavelength regions of the reflective screen of Example 2 were the same as those of the reflective screen of Example 1.

When the surface of the transparent film side was used as the measurement surface, the light diffuser showed a haze of 82.5%, a total light transmission of 95.0%, and a tristimulus value Y of 5.5 according to the reflection method. The value obtained by dividing the refractive index of the spherical microparticles with the refractive index of the transparent binder was 1.08.

<Composition of Coating Solution for Light Diffusing Layer of Example 2>

| | |
|---|---|
| Transparent binder (acrylic adhesive, refractive index: 1.47, solid content: 40%, Oribain BPS1109, TOYO INK MFG. CO., LTD. | 100 parts |
| Isocyanate type curing agent (solid content: 38%, Oribain BHS8515, TOYO INK MFG. CO., LTD.) | 2.4 parts |
| Spherical microparticles (polystyrene resin, refractive index: 1.59, mean particle diameter: 6.0 μm, Technopolymer SBX-6, Sekisui Plastics Co., Ltd.) | 4.1 parts |
| Ethyl acetate | 102.2 parts |

Example 3

A reflective screen of Example 3 was obtained in the same manner as that in Example 2, except that the coating solution for light diffusing layer of Example 2 was changed to a solution having the following composition. The average reflectances and maximum reflectances for lights of the wavelength regions of B, G, R, and R', and the average reflectance for light in the visible wavelength region other than lights of the aforementioned wavelength regions of the reflective screen of Example 3 were the same as those of the reflective screen of Example 1.

When the surface of the transparent film side was used as the measurement surface, the light diffuser showed a haze of 89.1%, a total light transmission of 97.0%, and a tristimulus value Y of 5.3 according to the reflection method. The value obtained by dividing the refractive index of the spherical microparticles with the refractive index of the transparent binder was 0.96.

<Composition of Coating Solution for Light Diffusing Layer of Example 3>

| | |
|---|---|
| Transparent binder (urethane type tackifier, refractive index: 1.50, solid content: 50%, Takelac A-971, Mitsui Chemicals Polyurethanes, Inc.) | 100 parts |
| Isocyanate type curing agent (solid content: 75%, Takenate A-3, Mitsui Chemicals Polyurethanes, Inc.) | 7.6 parts |
| Spherical microparticles (silicone resin, refractive index: 1.44, mean particle diameter: 2.0 μm, Tospearl 120, GE Toshiba Silicones Co., Ltd. | 5 parts |
| Methyl ethyl ketone | 15.8 parts |
| Toluene | 15.8 parts |

Example 4

Reflecting layers B, G, R, and R' were formed on a black film in the same manner as that in Example 1, and a light diffusing film (DILAD Screen WS, Kimoto Co., Ltd.) was laminated on the upper layer as a light diffuser to obtain a reflective screen of Example 4. The average reflectances and maximum reflectances for lights of the wavelength regions of B, G, R, and R', and the average reflectance for light in the visible wavelength region other than lights of the aforementioned wavelength regions of the reflective screen of Example 4 were the same as those of the reflective screen of Example 1.

When the surface of the light diffusing layer was used as the measurement surface, the light diffusing film showed a haze of 89.6%, a total light transmission of 94.8%, and a tristimulus value Y of 21.0 according to the reflection method.

Comparative Example 1

A reflective screen of Comparative Example 1 was obtained in the same manner as that in Example 4, except that the R' reflecting layer was not formed.

In the examples and comparative example mentioned above, the haze was measured by using a turbidimeter, NDH2000 (Nippon Denshoku Industries Co., Ltd) according to JIS K7105:1981, and the total light transmission was measured by using the same turbidimeter according to JIS K7361-1:1997. The tristimulus value Y mentioned in the examples and comparative example mentioned above was measured by the reflection method according to JIS Z8722:2000 using a color difference meter for color measurement, ZE2000 (Nippon Denshoku Industries Co., Ltd), with Light Source C as the illuminant for color measurement. The geometrical condition for illumination and light-receiving in ZE2000 was Condition d. Since the measurement samples showed high light transmission, the measurement by the reflection method was carefully performed so that the measured values should not be affected by transmitted light at the time of the measurement.

Then, images were projected on the reflective screens obtained in the examples and comparative example by using an LCD projector (XV-P3, Sharp Corporation) under illumination by fluorescent lights, and contrast in the bright environment and image color reproducibility for display of white color upon observation from an oblique direction with respect to the screens were evaluated. The results are shown in Table 1.

(1) Contrast

The projector images were observed by visual inspection from the front and evaluated with varying illumination by the fluorescent lights. A result that the images were observed with high contrast and good visibility even in a bright condition of 1000 lx or more is indicated with the symbol "⊚", a result that the images were observed with good visibility at an illumination of 500 to 1000 lx is indicated with the symbol "○", and a result that the images could be observed at an illumination lower than 500 lx is indicated with the symbol "X". The illumination means the illumination at centers of the screens not projected with images by the projector.

(2) Image Color Reproducibility

Under a condition that the illumination at centers of the screens not projected with images by the projector was kept at about 1000 lx, the projector was turned on to project white color over the total image area, and color coordinates were measured for the center of each screen from the front and oblique angles of 60° right and left from the frontal direction. The measured values for the measurement from the oblique angles are indicated with averages of the values measured from right and left. The color coordinates were measured by using a color difference meter for color measurement, CS-100 (Konica Minolta Co., Ltd.). The field used in CS-100 was a field of 2 degrees.

TABLE 1

| | | Image color reproducibility (displayed color) | |
|---|---|---|---|
| | Contrast | Front | 60° Left and right |
| Example 1 | ⊚ | x = 0.311  y = 0.455 | x = 0.316  y = 0.380 |
| Example 2 | ⊚ | x = 0.310  y = 0.462 | x = 0.317  y = 0.377 |
| Example 3 | ⊚ | x = 0.312  y = 0.449 | x = 0.316  y = 0.383 |
| Example 4 | ○ | x = 0.315  y = 0.434 | x = 0.316  y = 0.386 |
| Comparative Example 1 | ○ | x = 0.302  y = 0.437 | x = 0.237  y = 0.361 |

The reflective screens of Examples 1 to 4 used a multilayer optical film formed by alternately laminating thin films of at least two kinds of transparent dielectrics showing different refractive indices and selectively reflecting lights in specific wavelength regions as a reflecting layer, and the reflecting layer had a light reflecting property for light in the wavelength regions of blue, green, red, and 670 to 730 nm, and showed average reflectances for lights of the aforementioned wavelength regions higher than the average reflectance for light in the visible wavelength region other than the aforementioned wavelength regions, respectively. Therefore, they could reflect high contrast images even in a bright environment, and could reflect images with superior image color reproducibility, in particular, images substantially free from color change of the images even when the screens were observed from an oblique angle.

In particular, those of Examples 1 to 3 had a light diffuser showing a haze of 60% or more, a total light transmission of 70% or more, and a tristimulus value Y of 10 or less on the side of light-incident surface with respect to the reflecting layer, and therefore they did not substantially suffer from back diffusion of environmental light, thus did not increase brightness of dark portions of projector images, and could form images with the highest contrast.

On the other hand, the reflective screen of Comparative Example 1 used a multilayer optical film formed by alternately laminating thin films of at least two kinds of transparent dielectrics showing different refractive indices and selectively reflecting lights in specific wavelength regions as a reflecting layer, and the reflecting layer had a light reflecting property for light in the wavelength regions of blue, green, and red. Therefore, it reflected high contrast images even in a bright environment. However, it did not have a light reflecting property for light in the wavelength region of 670 to 730 nm, and therefore it caused color change of images, when the screen was observed from the oblique angle.

DESCRIPTION OF NOTATIONS 1, 1 . . . Substrate
2 . . . Reflecting layer
3 . . . Light diffuser
4 . . . Light absorbing layer
5 . . . Adhesive layer
6 . . . Reflective screen
21 . . . First reflecting layer
22 . . . Second reflecting layer
23 . . . Third reflecting layer
24 . . . Fourth reflecting layer
31 . . . Light diffusing layer

I claim:

1. A refractive screen including a multilayer optical film comprising at least two kinds of alternately laminated transparent dielectric thin films selectively reflecting light in specific wavelength regions, thereby serving as reflecting layers forming a reflecting element, wherein the reflecting element has a light reflecting property for light in the wavelength regions of blue (420 to 480 nm), green (520 to 580 nm), red (590 to 650 nm), and 670 to 730 nm, and shows average reflectances for lights of said wavelength regions higher than an average reflectance for light in the visible wavelength region other than lights of said wavelength regions, respectively.

2. The reflective screen according to claim 1, wherein the reflecting element shows a difference of 10% or more between each of the average reflectances for lights of the wavelength regions of blue (420 to 480 nm), green (520 to 580 nm), red (590 to 650 nm) and 670 to 730 nm and the average reflectance for light in the visible wavelength region other than lights of said wavelength regions.

3. The reflective screen according to claim 2, wherein the reflecting element shows a difference of 25% or more between each of the maximum reflectances for light in the wavelength regions of blue (420 to 480 nm), green (520 to 580 nm), red (590 to 650 nm) and 670 to 730 nm and the average reflectance for light in the visible wavelength region other than lights of said wavelength regions.

4. The reflective screen according to claim 3, wherein the reflecting element shows an average reflectance for light in the wavelength region of 670 to 730 nm substantially equal to the average reflectance for light in the wavelength region of red (590 to 650 nm).

5. The reflective screen according to claim 4, wherein the reflecting element comprises a transparent polymer resin.

6. The reflective screen according to claim 5, wherein the reflecting element is formed by a multilayer extrusion method.

7. The reflective screen according to claim 6, wherein the reflecting element is formed by laminating a first reflecting layer having a light reflecting property for light in the wavelength region of blue (420 to 480 nm), a second reflecting layer having a light reflecting property for light in the wavelength region of green (520 to 580 nm), a third reflecting layer having a light reflecting property for light in the wavelength region of red (590 to 650 nm), and a fourth reflecting layer having a light reflecting property for light in the wavelength region of 670 to 730 nm.

8. The reflective screen according to claim 5, wherein the reflecting element is formed by laminating a first reflecting layer having a light reflecting property for light in the wavelength region of blue (420 to 480 nm), a second reflecting layer having a light reflecting property for light in the wavelength region of green (520 to 580 nm), a third reflecting layer having a light reflecting property for light in the wavelength region of red (590 to 650 nm), and a fourth reflecting layer having a light reflecting property for light in the wavelength region of 670 to 730 nm.

9. The reflective screen according to claim 4, wherein the reflecting element is formed by laminating a first reflecting layer having a light reflecting property for light in the wavelength region of blue (420 to 480 nm), a second reflecting layer having a light reflecting property for light in the wavelength region of green (520 to 580 nm), a third reflecting layer having a light reflecting property for light in the wavelength region of red (590 to 650 nm), and a fourth reflecting layer having a light reflecting property for light in the wavelength region of 670 to 730 nm.

10. The reflective screen according to claim 3, wherein the reflecting element is formed by laminating a first reflecting layer having a light reflecting property for light in the wavelength region of blue (420 to 480 nm), a second reflecting layer having a light reflecting property for light in the wavelength region of green (520 to 580 nm), a third reflecting layer having a light reflecting property for light in the wavelength region of red (590 to 650 nm), and a fourth reflecting layer having a light reflecting property for light in the wavelength region of 670 to 730 nm.

11. The reflective screen according to claim 2, wherein the reflecting element is formed by laminating a first reflecting layer having a light reflecting property for light in the wavelength region of blue (420 to 480 nm), a second reflecting layer having a light reflecting property for light in the wavelength region of green (520 to 580 nm), a third reflecting layer having a light reflecting property for light in the wavelength region of red (590 to 650 nm), and a fourth reflecting layer having a light reflecting property for light in the wavelength region of 670 to 730 nm.

12. The reflective screen according to claim 1, wherein the reflecting element is formed by laminating a first reflecting layer having a light reflecting property for light in the wavelength region of blue (420 to 480 nm), a second reflecting layer having a light reflecting property for light in the wavelength region of green (520 to 580 nm), a third reflecting layer having a light reflecting property for light in the wavelength region of red (590 to 650 nm), and a fourth reflecting layer having a light reflecting property for light in the wavelength region of 670 to 730 nm.

13. The reflective screen according to claim 1 wherein the multilayer optical film further comprises a light absorbing layer, for absorbing light transmitted by the reflecting element, on a surface of the reflecting element opposite to a light entering surface.

14. The reflective screen according to claim 13, wherein the light absorbing element comprises a black film.

15. The reflective screen according to claim 1 further including a light diffuser on a light incident surface side of the reflecting element.

16. The reflective screen according to claim 15, wherein the light diffuser shows a haze of 60% or more according to JIS K7105:1981, a total light transmission of 70% or more according to JIS K7361-1:1997, and a tristimulus value Y of 10 or less according to the reflection method of JIS Z8722:2000.

17. The reflective screen according to claim 16, wherein the light diffuser comprises at least one light diffusing layer, the one light diffusing layer comprising transparent spherical microparticles and a transparent binder having a refractive index different from that of the spherical microparticles, the spherical microparticles have a mean particle diameter of 1 to 10 μm, and the value obtained by dividing the refractive index of the spherical microparticles with the refractive index of the transparent binder is between 0.91 and 1.09 but not 1.00.

18. The reflective screen according to claim 1, wherein the reflecting element shows a difference of 25% or more between each of the maximum reflectances for light in the wavelength regions of blue (420 to 480 nm), green (520 to 580 nm), red (590 to 650 nm) and 670 to 730 nm and the average reflectance for light in the visible wavelength region other than lights of said wavelength regions.

19. The reflective screen according to claim 18, wherein the reflecting element shows an average reflectance for light in the wavelength region of 670 to 730 nm substantially equal to the average reflectance for light in the wavelength region of red (590 to 650 nm).

20. The reflective screen according to claim 1, wherein the reflecting element shows an average reflectance for light in the wavelength region of 670 to 730 nm substantially equal to the average reflectance for light in the wavelength region of red (590 to 650 nm).

* * * * *